Patented Dec. 2, 1952

2,620,347

UNITED STATES PATENT OFFICE 2,620,347

CATALYTIC HYDROGENATION OF CARBON MONOXIDE WITH IRON CATALYSTS

Walter Rottig, Oberhausen-Sterkrade-Nord, Germany, assignor to Ruhrchemie Aktiengesellschaft, Oberhausen-Holten, Germany, a corporation of Germany No Drawing. Application April 26, 1950, Serial No. 158,320. In Germany May 7, 1949

12 Claims. (Cl. 260—449.6)

This invention relates to new and useful improvements in the catalytic hydrogenation of carbon monoxide.

In the hydrogenation of carbon monoxide, a mixture of carbon monoxide and hydrogen, conventionally termed synthesis gas, is brought into contact with a suitable catalyst and is reacted to form aliphatic hydrocarbons of both the saturated and unsaturated type and also some oxygenated derivatives thereof. A convenient source for the synthesis gas is for instance water gas. The synthesis has become generically known as the Fischer-Tropsch synthesis, and the general conditions of pressure, temperatures, type, composition, treatment, or preparation of catalyst and of catalyst additives essential for such synthesis are well known and established in the art.

Iron catalysts are used to a large extent in catalytic carbon monoxide hydrogenation, particularly because they lend themselves to a synthesis procedure at about atmospheric pressure. Carbon monoxide hydrogenation with iron catalysts at about atmospheric pressure is carried out at initial temperatures of from 210–220° C. Lower temperatures will not give satisfactory yields in that the carbon monoxide hydrogenation conversion is only about 30–40% within the lower temperature range. It has been for that reason customary in the past to bring the contact catalyst as quickly as possible to the initial temperature of a minimum of 210° C. at which a relatively satisfactory carbon monoxide and hydrogen conversion of about 60–75% is obtained with an hourly throughput of 100 NCBM synthesis gas per CBM volume of catalyst material. When including in the conversion evaluation the fact that iron catalysts yield at normal atmospheric pressure a partial conversion of the gaseous products into carbon dioxide, an actual carbon monoxide conversion of about 80–96% is obtained when hydrogenating at a minimum effected temperature of 210° C. With this process hitherto practised and particularly when using slightly alkaline iron catalyst, about 15–25% of the synthesis products are obtained in the form of relatively high molecular hydrocarbons comprising predominantly paraffin or similar high melting point hydrocarbon waxes while methane is generally formed to the extent of about 10–16% of the total yield.

One object of the invention comprises among others an improved method for the catalytic hydrogenation of carbon monoxide.

Another object of the invention comprises the catalytic hydrogenation of carbon monoxide with increased formation of higher molecular hydrocarbons and decreased formation of methane.

Another object of the invention is the carbon monoxide hydrogenation with iron catalysts increasing the useful life of the catalyst.

A still further object of the invention is a carbon monoxide hydrogenation method using an iron catalyst and permitting synthesis to be carried out at a lowered temperature and at conversion yields higher than those normally maintaining at said temperatures.

Still another object of the invention is a novel method of preparing an iron catalyst capable of modifying a carbon monoxide hydrogenation for the attainment of the herein stated objectives.

The foregoing and yet other objects of the invention may be seen from the following description.

In accordance with the invention, synthesis gas is passed over and in contact with an iron catalyst which has been activated by continuously passing synthesis gas over and in contact with it for at least 96 hours while maintaining the temperature at about 150° C. to 195° C. extracting the paraffin from the catalyst at that temperature with an extraction solvent and repeating the treatment at least one additional time with a synthesis gas contacting for about 100 to 200 hours at about atmospheric pressure and while maintaining the synthesis temperature during said contact at from 170–200° C., and preferably at least throughout the major portion of the catalyst material at a temperature of about 190–200° C.

It is known that iron catalysts used for synthesis at about normal atmospheric pressure have to be regenerated from time to time by solvent extraction of paraffin or other waxy material with which they have become impregnated during the synthesis reaction. This extraction of paraffin material is a conventional procedure and carried out with well known solvents for normally solid paraffin hydrocarbons, the preferred solvents usually being hydrocarbons or hydrocarbon mixtures such as for example so-called Diesel oil fractions having, for instance, a boiling point between 220–300° C. or hydrogenated Diesel oil fractions having, for instance, a boiling point between 220–260° C. or any other paraffin solvent or solvent mixture within the known practice of the art for solvent extraction of paraffin material for the regeneration of iron catalysts used in hydrocarbon synthesis of the Fischer-Tropsch type. Of particular advantage is the use of high boiling paraffinic, naphthenic or aromatic hydrocarbons as solvent.

Within the preferred embodiment of the invention, the solvent extraction of iron catalyst containing normally solid synthesis paraffinic material is effected at a temperature of about 170–200° C., i. e., the temperature at which the synthesis is to be carried out utilizing the solvent extracted regenerated iron catalyst. For best results, however, it is of advantage to actually subject a normal Fischer-Tropsch type iron catalyst to synthesis with a carbon monoxide hydrogen mixture such as, for instance, water gas, at a temperature of about 170–200° C. The conversion yield is relatively low, being between about 30 and 40%, and the catalyst is usually relatively exhausted after about 70–150 hours use to necessitate paraffin extraction therefrom. This regenerated catalyst, however, obtained and extracted in this manner when again contacted with synthesis gas will yield an appreciably improved conversion even though there is no increase in the synthesis temperature over that used in the synthesis with the catalyst material prior to its exhaustion and extraction. When then the catalyst is again exhausted and once more regenerated by solvent extraction, and this procedure is repeated for a total of about 4–5 catalyst regenerations, the solvent extracted regenerated iron catalyst material having by now had a total operational use of about 500–700 hours, shows such an increased reactivity that the CO plus $H_2$ conversion reaches a close to normal value which is usually around 72%.

The catalyst thusly prepared by repeated solvent extraction regeneration at the synthesis temperature between 170 and 200° C., and preferably between 190 and 200° C., may then be utilized for a considerable period of time before any appreciable drop in efficiency is noted. As is common practice, synthesis temperatures are raised, within a limited range, upon first-appearing drop in catalyst efficiency. Synthesis using an iron catalyst at about atmospheric pressure is limited for effective operation to a top temperature of about 230–235° C. Thus when proceeding in accordance with conventional practice at an initial temperature of 210° C., an interval of only 15–20° C. is available for gradual raising of the synthesis temperature commensurate with the drop in efficiency of catalyst material. On the other hand, when using the process in accordance with this invention and an initial synthesis temperature of as low as 170° C., the interval available for gradual rise in synthesis temperature totals approximately 60–65° C., which makes it possible to use the catalyst for considerably longer periods of time before regeneration is again necessary than was hitherto possible. This is particularly accentuated when considering the fact that temperature increases throughout permissive range are normally effected at 1–2° C. intervals.

By reason of the lower synthesis temperature that may be applied when proceeding in accordance with the invention, the formation of methane is considerably less than when proceeding in accordance with conventional carbon monoxide hydrogenation with iron catalysts at about atmospheric pressure. Yet a relatively high conversion of the synthesis gas is maintained in the new process. In addition to this, the yield of higher molecular hydrocarbons obtained according to the invention, and particularly those boiling above 300° C. is appreciably increased over the yield that was obtained when proceeding according to conventional practices and when using iron catalysts.

Another remarkable advantage in accordance with the invention is the fact that the total life of the catalyst is appreciably lengthened. By reason of the lower reaction temperatures to which the catalyst is subjected in the process of the invention, considerably lesser thermic demands are made upon the catalyst.

Within the preferred embodiment of the invention, particularly advantageous results are obtained when using iron catalysts impregnated with the alkali metal salts of a substantially non-volatile inorganic acid such as phosphoric, silicic, boric, tungstic, molybdic, and similar type acids, and preferably the potassium salts of these acids, especially advantageous results having been obtained with potassium silicate and potassium phosphate, the amount of alkali salts is preferably sufficient to yield a $K_2O$ equivalent alkalinity of from .5–10% per weight of iron in the catalyst material. The preparation of a catalyst material containing or impregnated with a suitable alkali salt, ratios of materials, etc., are about the same as described in my co-pending application, Serial Number 127,795 filed November 16, 1949, in which a similar iron catalyst material is used though in connection with a different process utilizing pressures from about 10–50 kg./sq. cm.

The preparation of a suitable iron catalyst useful in accordance with the invention is preferably conducted by a reducing treatment of a suitable iron salt or mixture of iron salts as is common practice in accordance with the preparation of conventional iron catalysts for Fischer-Tropsch synthesis except that gas velocities are used equivalent to about 50–100 cm./sec. and preferably 100–200 cm./sec. When proceeding in this manner, using conventional reducing towers or the like, it is possible to increase the layering of the catalyst material or composition to be reduced to catalyst material to a multiple of that ordinarily hitherto obtainable with conventional practices. When lesser gas velocities of hydrogen are used, layering to the extent of about 100 cm. results in considerable differentials in reduction values between the upper and lower layers of contact material. These differentials are practically impossible to eliminate even with prolonged passage of the reducing gas such as hydrogen. On the other hand, when proceeding in accordance with the preferred preparation of iron catalyst as herein stated, and using high velocities of a reducing gas such as hydrogen, no such differentials occur in the extent of reduction of contact material between the upper and lower layers thereof. For the purpose of obtaining particularly efficacious catalyst characteristics, the reducing gas used in the preparation of the catalyst material should be substantially free from carbon dioxide and water vapor.

The following examples are furnished by way of illustration but not of limitation:

*Example I*

An iron catalyst material containing about 100 parts by weight of iron, 5 parts by weight of copper, and 10 parts by weight of calcium oxide, was obtained by soda precipitation of a solution of corresponding nitrates at a pH of about 7. The precipitate was carefully washed and dried and subsequently impregnated with potassium silicate so adjusted in amount that the total iron material contained the equivalent of about 5% by weight of KOH. The resulting impregnate was thereafter subjected to hydrogen reduction at a temperature of about 225° C., a hydrogen velocity of 120 cm./sec., for a total period of 60 minutes. During the reduction, the material was layered to a height of about 120 cm. in a conventional reducing column. The hydrogen used for the reduction only contained traces of carbon dioxide and of water.

The reduced catalyst material was then contacted with water gas at a temperature of 160° C. at a rate of flow of 100 Nl water gas per hour per liter of catalyst material. Synthesis temperature was gradually increased within 48 hours to a top temperature of 195° C. Within this period, a CO plus $H_2$ conversion of approximately 39% was obtained. Within the following 48 hours, the CO plus $H_2$ conversion dropped to about 30% by reason of catalyst adsorption of paraffin material.

The catalyst material was thereupon exhaustively extracted at a temperature between 170–200° C. with four times its volume of a Diesel oil fraction having a boiling point of approximately 220–300° C. Immediately after this extraction, the regenerated catalyst was again subjected to the synthesis process with the water gas beginning with a temperature of 160° C. and ending with a temperature of about 195° C. The CO plus $H_2$ conversion yield averaged in this case about 48%. During the next 120 hours, the yield decreased to an average of about 36% by reason of adsorption of paraffin material.

Further extractions were carried out in the manner above set forth followed in each case by a synthesis with water gas in the same manner herein stated until an appreciable drop in catalyst efficiency was noted. After each additional extraction, the regenerated iron catalyst material showed increased activity as compared to that which it possessed after the previous extraction. Thus the regenerated catalyst yielded a CO plus $H_2$ conversion of 59% after the second extraction, of 65% after the third extraction, of 70% after the fourth extraction, and of 73% after the fifth extraction. Extractions after the fifth regeneration did not appreciably increase the activity of the catalyst.

Catalyst material regenerated with five exhaustive solvent extractions were then used as the contact material at a substantially constant operating temperature of 198° C. at about atmospheric pressure using water gas as the synthesis gas. This iron catalyst material had a total useful life of several thousand hours at a conversion rate of CO plus $H_2$ of about 72%. The catalyst material was regenerated by paraffin material extraction first after every 7 days and later after every 10–14 days. The activity of the catalyst material remained substantially constant after each such extraction. The catalyst material had thus acquired after the 5 preliminary regeneration cycles a constancy of output efficiency attuned to the lower temperature of operation.

Notwithstanding the relatively high CO plus $H_2$ conversion, the formation of methane was relatively small and did not at any time exceed 8–10% by volume of synthesis products. The yield of hydrocarbons with a boiling point above 300° C. was appreciably larger than that obtained with the hitherto practiced iron catalyst synthesis procedure.

*Example II*

An iron catalyst comprising 100 parts by weight of iron and 3 parts by weight of copper was obtained by precipitation with a hot aqueous soda solution of a hot solution of the corresponding nitrates at a pH of about 7. The precipitated mass was separated by filtration, carefully washed and then impregnated with primary potassium phosphate in amount sufficient to thereby impart to the ultimate catalyst material an alkali content of about 3% calculated as $K_2O$ and based upon the weight of iron present in the catalyst. The dried and granulated impregnated material was then reduced at 230° C. with hydrogen passed through the same at a linear velocity of about 1.4 m./sec. (measured cold) for a total period of about 60 minutes using the same reducing column and layering as specified in the preceding example. The resulting catalyst material possessed a reduction value equivalent to 28% free iron by weight of the total iron present in the material. The catalyst material was then subjected to synthesis at about atmospheric pressure and at a temperature of 150° C., passing water gas over the same at a rate of flow of 100 Nl water gas per hour per liter catalyst material.

The synthesis temperature was increased within a period of 48 hours to 190° C. whereby an average CO plus $H_2$ conversion of approximately 85% was obtained. In the course of the next following 48 hours operation, the conversion rate dropped down to an average of about 27% by reason of catalyst adsorption of paraffin material. The exhausted catalyst was then thoroughly extracted at a temperature between 170 and 195° C. with 5 times its volume of hydrogenated Diesel oil fraction having a boiling point between 220–260° C. The resulting regenerated catalyst was then immediately subjected to synthesis with water gas under the same conditions of operation above set forth. The CO plus $H_2$ conversion in this case was about 45% for the regenerated catalyst. After use for about 72 hours, the conversion rate dropped to about 40% by reason of catalyst adsorption of paraffin material.

Upon further repeated synthesis and regeneration cycles carried on in about the same manner as the above set forth first such cycle, except that the top temperature was gradually raised from 190–195° C. with each synthesis treatment carried for about 100–200 hours, increased reactivity of the regenerated catalyst was in each case observed until finally substantial constancy maintained. Thus the conversion rate after respective regenerations increased from 55–61% and from 55–71% (CO plus $H_2$) being thereafter substantially constant at the latter figure.

After the last regenerative extraction of catalyst yielding a CO plus $H_2$ conversion rate of about 71%, the catalyst material was ready to be used for continuous operations at a substantially constant operating temperature of about 197° C. with a total life of several thousand hours and an average conversion rate of about 70% CO plus $H_2$. During this period regenerative extraction (without any appreciable change in catalyst activity after regeneration) was carried out for the removal of adsorbed paraffin material at first every 5–6 days and subsequently every 10–14 days. After each extraction, however, the catalyst possessed its full 70–71% conversion rate efficiency.

Despite the relatively high conversion rate, methane formation did not exceed 9–11%. The yield of higher molecular hydrocarbons with boiling points above 390° C. was about 30% as compared to a yield of about 20% of such hydrocarbons when using the same non-regenerated iron catalyst in the conventional manner at higher synthesis temperatures.

As is thus apparent from the foregoing, increased efficiency of the catalyst is obtained by at least one pretreatment including a synthesis gas reaction at about atmospheric pressure and at a temperature from 170–200° C. until appreciable amounts of paraffin material are absorbed by said catalyst, the synthesis gas reaction being followed by raised temperature extraction of said paraffin material with an organic solvent therefor. The synthesis gas reaction is in each case continued for at least 96 hours and preferably multiple pretreatments are used preferably at least 3 in number and aggregating a sufficient number to yield a regenerated catalyst which, when subjected to a further such pretreatment, shows no appreciable increase in its CO plus $H_2$ conversion rate. This effect is achieved in the majority of cases by continuing the synthesis gas reaction for the first pretreatment for at least 96 hours and at least the major portion of the remaining pretreatments for about 100–200 hours.

When utilizing within the preferred embodiment of the invention the high velocity hydrogen reduction of particled iron material convertible to an iron catalyst suitable for carbon monoxide hydrogenation, the hydrogen reduction is carried out at a temperature of 200–350° C. and preferably 200–250° C., a gas velocity of 50–500 cm./sec. and preferably 100–200 cm./sec. until at least 25% by weight of total iron is obtained in reduced form.

I claim:

1. Method for the activation of precipitated iron catalysts for use in the catalytic hydrogenation of carbon monoxide with an increased formation of high molecular hydrocarbons and a reduced methane formation, which comprises substantially continuously passing synthesis gas over and in contact with such a catalyst for at least 96 hours at a temperature of about 170°–200° C., subjecting the said catalyst to an extraction with a solvent at said temperature to remove the paraffin therefrom, thereafter directly at least one additional time substantially continuously passing synthesis gas over and in contact with said catalyst for about 100–200 hours at said temperature, and extracting the paraffin therefrom at said temperature with a solvent.

2. Method according to claim 1, in which said catalyst is contacted with synthesis gas for a total time of about 500–700 hours and in which the paraffin is extracted from the catalyst with a solvent at said temperature at least five different times.

3. Method according to claim 1 in which said catalyst has an alkali content calculated as $K_2O$ of about 0.5 to 10% by weight of the iron in said catalyst.

4. Method according to claim 3 in which said catalyst is a catalyst impregnated with an alkali salt of a nonvolatile inorganic acid in amount equivalent to 4% to 8% of $K_2O$ by weight of the iron in said catalyst.

5. Method according to claim 4 in which said alkali salt is at least one member of the group consisting of potassium phosphate and potassium silicate.

6. Method according to claim 1 in which said solvent is a normally liquid hydrocarbon having a boiling point above 200° C.

7. Method according to claim 1 in which said catalyst is prepared prior to said activating by passing hydrogen through a particled iron material convertible by hydrogen reduction to an iron catalyst and impregnated with an alkali salt of a nonvolatile inorganic acid in amount equivalent to 0.5 to 10% by weight of KOH in relation to the iron in said material, at a temperature of about 200° C. to 350° C. and a hydrogen velocity through said material of about 50 to 500 cubic meters per second until a reached iron content of at least 25% by weight of the total iron is obtained.

8. Method according to claim 7 in which said temperature for hydrogen reduction is about 200° C. to 250° C. and in which said velocity is about 100 to 200 centimeters per second.

9. An iron catalyst for the catalytic hydrogenation of carbon monoxide activated in accordance with the method of claim 1.

10. An iron catalyst for the catalytic hydrogenation of carbon monoxide comprising catalyst activated in accordance with the method of claim 7.

11. In the catalytic hydrogenation of carbon monoxide at atmospheric pressure and raised temperature, the improvement which comprises continuously passing a synthesis gas over and in contact with an iron catalyst activated in accordance with the method of claim 1, and maintaining the synthesis temperature during said contact at about 170° C. to 200° C.

12. In the catalytic hydrogenation of carbon monoxide at about atmospheric pressure and raised temperature, the improvement which comprises continuously passing synthesis gas over and in contact with a catalyst activated in accordance with claim 7, and maintaining the synthesis temperature during said contact at about 170° C. to 200° C.

WALTER ROTTIG.

REFERENCES CITED

The following references are of record in the file of this patent:

UNITED STATES PATENTS

| Number | Name | Date |
| --- | --- | --- |
| 2,159,140 | Eckell et al. | May 23, 1939 |
| 2,233,726 | Feisst et al. | Apr. 15, 1941 |
| 2,287,891 | Linckh | June 30, 1942 |